Figure 1:
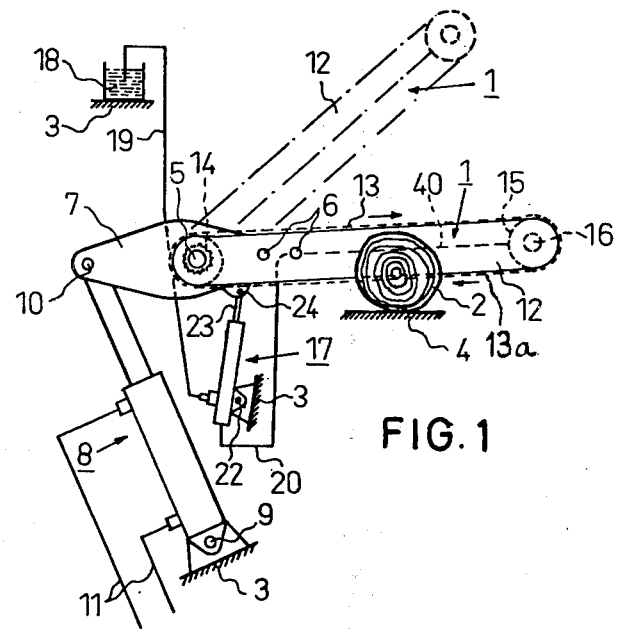

United States Patent [19]

Karlsson

[11] 4,016,956
[45] Apr. 12, 1977

[54] APPARATUS FOR LUBRICATING SAW CHAINS IN GUIDE BARS

[76] Inventor: Börje E. Karlsson, Rottne, Sweden, 360 30

[22] Filed: Oct. 10, 1975

[21] Appl. No.: 621,363

[52] U.S. Cl. .............................. 184/15 R; 184/32; 83/169

[51] Int. Cl.² .......................................... F16N 7/24

[58] Field of Search ............ 184/15 R, 15 A, 15 B, 184/16, 17, 1 C, 6.1, 6.3, 32; 83/169, 799, 800, 801

[56] References Cited

UNITED STATES PATENTS

| 2,316,996 | 4/1943 | Smith | 184/15 R |
| 3,010,538 | 11/1961 | Strunk | 184/15 R |
| 3,155,191 | 10/1964 | Nelson | 184/15 R |
| 3,459,279 | 8/1969 | Sensui et al. | 184/15 R |
| 3,776,369 | 12/1973 | Schrack et al. | 184/15 R |

*Primary Examiner*—Samuel W. Engle
*Assistant Examiner*—S. A. Cangialosi
*Attorney, Agent, or Firm*—John J. Dennemeyer

[57] ABSTRACT

An apparatus for lubricating a chain saw mounted on the guide rail of a guide bar comprises a lubrication system for feeding a lubricant through a conduit in the guide bar to the saw chain while the guide bar is in the operating down position and the lubricant flow is interrupted when the guide bar is moved into the non-operating up position of the saw chain. The lubrication system provides a saving of lubricant by feeding it to the chain only during the working process and only to its essential working parts.

12 Claims, 2 Drawing Figures

APPARATUS FOR LUBRICATING SAW CHAINS IN GUIDE BARS

The present invention relates to an apparatus for lubricating saw chains in guide bars comprising a guide rail and a saw chain travelling thereon, the guide rail being mounted on a frame and adapted to be rotated by means of at least one power unit in one direction so that an object may be processed by the chain saw, preferably a tree trunk which is cross-cut by the saw chain, and after processing of the object is rotated back in the opposite direction, at which a lubricant, preferably lubrication oil from at least one lubricant reservoir, is conducted to the saw chain through at least one conduit by the action of a lubricant pump.

Manually operated power saws are provided with different types of devices for feeding lubricant to the saw chain. Such devices are operating in relation to the working condition of the chain saw so that lubricant is supplied to the chain with the driving thereof and the supply of lubricant ceases when the chain saw is stopped.

In manually operated power saws the chain usually is started just prior to starting the sawing work and it is stopped immediately after the sawing process. This means that the device for the feeding of lubricant in manually operated power saws is operating substantially only during the sawing process, and this has also been the purpose of the existing feeding devices.

However, there are chain saws with guide bars mounted on a frame wherein the conventional feeding devices cannot be used. In fact guide bars mounted on a frame also are used inter alia to cross-cut for instance a log into a number of parts, and this is usually carried out by rapidly moving the log in relation to the guide bar and rotating the guide bar in one direction for sawing and in the opposite direction to allow a movement of the log. These moments are carried out very rapidly and the chain saw is not stopped between the cross-cutting moments but is driven until the whole log or a plurality of logs has been processed. When conventional feeding devices are used in connection with guide bars of this type the lubricant would be supplied also between the sawing moments so that a large proportion of the lubricant would be consumed without being utilized.

The purpose of the present invention is to to provide an apparatus for feeding lubricant and operating independently of the action of the chain while allowing a lubrication of the chain during the sawing moment. According to the invention this has been accomplished by means of the apparatus defined in the accompanying claims.

Figure 2:
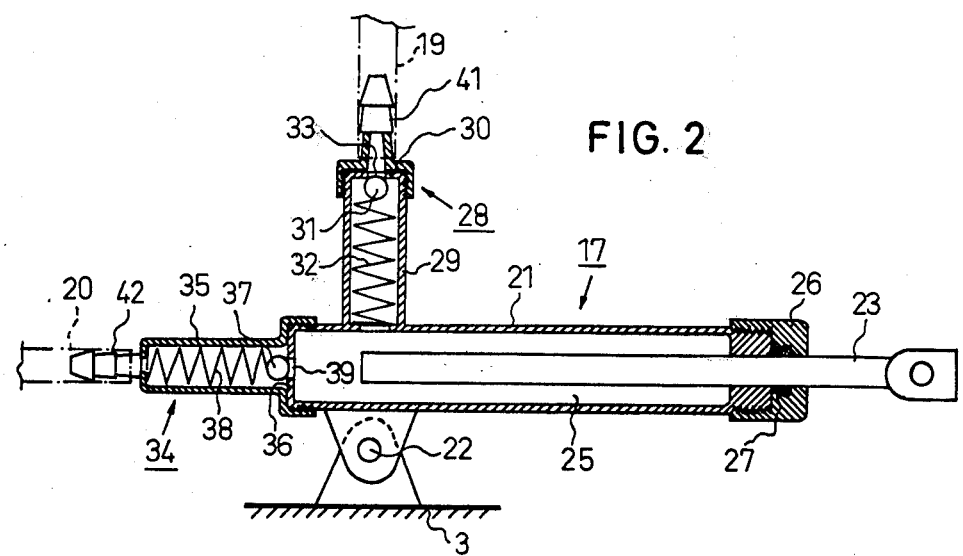

The invention will be more exactly described hereafter with reference to the accompanying drawing in which:

FIG. 1 is a diagrammatic side elevation view of a guide bar with a feeding device for lubricant according to the invention and, FIG. 2 is a sectional view which shows diagrammatically a pump forming a part of the feeding device.

In FIG. 1 the numeral 1 represents a guide bar mounted on a frame 3, for instance for cross-cut sawing of logs 2. Parts of the frame 3 are shown merely diagrammatically, as is the path 4 of the log 2. Normally this path 4 is provided with a transport and/or feeding mechanism for moving the logs in relation to the guide bar 1, but alternatively the frame 3 may be movable in relation to the logs 2.

The guide bar 1 is adapted to be rotated in relation to the log 2 for crosscutting it and is thereafter rotated back into a position above the log. For this purpose the guide bar 1 is rotatably connected to the frame 3 by means of a horizontal shaft 5. The main portion of the guide bar 1 extends from the shaft 5 in one direction, and an arm 7 fixedly attached to the guide bar by means of bolts 6 with its main portion extends from the shaft 5 in the opposite direction. The free end of the arm 7 is connected to the frame 3 by means of a power unit, preferably a hydraulic unit 8, the cylinder of which is mounted by means of a hinged shaft 9 on the frame 3, and whose piston is mounted by means of a hinged shaft 10 on the arm 7. The hydraulic unit 8 is connected to a source of pressure medium (not shown) through conduits 11 and is controlled by means of this pressure medium to rotate the guide bar downwardly to crosscut the log 2 and upwardly to release the guide bar from the log 2 after completed sawing. In the drawing the guide bar 1 is shown in full lines in a position in which the log 2 is nearly crosscut, and in broken lines in a position above the log to allow the log or parts thereof to be moved along the path 4.

The guide bar 1 may be conventionally shaped. For instance it may have a longitudinal guide rail 12 with one or more guide tracks running thereabout. In the guide track lies an endless saw chain 13 having sawing portions extending from the track. The chain 13 is running over a driving motor 14, preferably a hydraulic motor, the center of which preferably coincides with the shaft 5, i.e. the rotation axis of the guide bar. The chain further is running over an end wheel 15 which is mounted by means of a shaft 16 at the free end of the guide bar. The above elements of the guide bar 1 are already known and will therefore not be more specifically described.

It is important that the chain is supplied with lubricant, such as lubrication oil during the sawing process but the oil feeding is interrupted when the guide bar is turned upwardly, without making it necessary to stop the working of the chain 13, i.e to stop the motor 14. According to the invention this has been realized in that a lubricant pump 17 is controlled to operate in relation to the movement of the guide bar so that it draws lubrication oil from a lubricant reservoir 18 (for instance an oil tank mounted on the frame 3) through an oil conduit 19 when the guide bar 1 is rotated away from the log 2, and forces the lubrication oil through a conduit toward the guide bar 1 when the guide bar is rotated in the opposite direction, so that the lubrication oil is supplied to the chain 13 at least during a part of this rotation movement.

The lubricant pump 17 according to the embodiment shown consists of a pump housing 21 which is mounted by means of a hinge shaft 22 on the frame 3. The hinge shaft 22 is mounted beside the longitudinal axis of a piston projecting from the pump housing 21. From the interior of the pump housing 21 projects a piston 23 whose free end is mounted by means of a hinged shaft 24 on the guide bar 1 or the arm 7 spaced from the rotation shaft 5 of the guide bar 1.

The pump housing 21 comprises a space 25 into which the piston 23 extends through an end piece 26 with a sealing ring 27. The space 25 is connected to the oil conduit 19 from the oil tank 18 through a suction valve 28. The valve is mounted in a side branch 29 of the pump housing 21 and consists of a valve seat 30 and a valve body 31 actuated by a compression spring 32 to be pressed against the valve seat 30 in order to close the inlet opening 33 of the space 25. The space 25 is connected further through the pressure conduit 20 to the guide bar 1 by means of a pressure valve 34. This valve is mounted in a portion 35 of the pump housing 21 and consists of a valve seat 36 and a valve body 37 actuated by a compression spring 38 to be pressed against the valve seat 36 to close the outlet port 39 of the space 25.

By means of these very simple valves an extremely reliable pumping action is obtained. When the piston 23 moves to the right (FIG. 2), i.e. when the guide bar pulls the piston 23 out of the space 25 in an upwardly rotating movement, a low pressure is created in this space and oil is drawn from the tank 18 through the conduit 19 and the valve 28 which opens into the space 25, and at the same time the valve 34 closes the opening 39 thereby preventing oil from being drawn back from the conduit 20. When the piston 23 then moves to the left, i.e. when the guide bar 1 is rotated downwardly, it will force the oil of the space through the opened valve 34, and at the same time the valve 28 keeps the opening 33 closed to prevent a return flow of oil toward the tank 18.

The lubricant pump 17 and/or its piston 23 may be adapted and/or shaped to pump oil to the saw chain 13 with the starting of the downward rotation of the guide bar and during the total downward rotation. The pumping interval may be varied by adjustment of the pump in relation to the frame 3 or of the piston in relation to the guide bar 1. Thus, for instance, the bracket of the hinged shaft 24 may be movably mounted on the guide bar 1 or the arm 7.

Due to the fact that a suction and pressure effect is provided by a volume change in the space 25 of the pump housing 21 the piston may have the simplest possible shape and need not be provided with separate pressure elements but may consist only of a longitudinal rod, as shown in FIG. 2.

An important feature is further that the oil is supplied to the saw chain 13 in such a way that the active portions therof will have the best possible lubrication. To this end the oil conduit 20 is connected preferably to the guide rail 12 of the guide bar 1 in such a way that it opens into an inner channel 40 extending within the guide rail 12. This channel 40 extends in the longitudinal direction of the guide rail 12 toward the free end thereof and opens into an opening in which the end wheel 15 is mounted. The oil passes through the inner channel 40 to the outer end of the guide bar 1 and flows to the chain at the lower portion of the end wheel 15 so that the lower portion 13a of the chain extending along the under-side of the guide bar is properly lubricated. Accordingly the appropriate portion 13a of the saw chain 13 will be correctly lubricated, i.e. without loss of oil by unnecessary waste or by lubrication of unimportant portions of the chain.

The arrangement described above is intended to clearly show an embodiment of simple construction, but this may be modified within the scope of the appended claims. Thus for instance the lubricant feeding and outlet elements 29 and 35 of the pump housing may be provided with coupling means 41 and 42 to allow a rapid coupling of the conduits 19 and 20.

What is claimed is:

1. Apparatus for lubricating a saw chain travelling on guide rail means carried by a guide bar, wherein said guide bar is mounted on a frame and is adapted to be rotated by power unit means in one direction to crosscut an object, afterwhich it is rotated back in the opposite direction, and wherein lubricant is conducted from a reservoir means to the saw chain through conduit means by the action of a lubricant pump, said apparatus comprising: a lubricant pump having a pump housing including a space therewithin into which lubricant is drawn from said reservoir means and from which it is transmitted to said saw chain, and a piston reciprocally mounted within said space, said lubricant pump being connected to said frame and said guide bar in such a way that the piston is moved upon rotation of the guide bar in said one direction to establish pressure within said space to force lubricant therefrom to said saw chain, and upon rotation of said guide bar in the opposite direction to establish suction in said space for drawing lubricant from said reservoir means; first conduit means connecting said pump housing space with said reservoir means; a suction valve connected in said first conduit means, arranged to be opened by suction in said space whereby to draw lubricant into said space from said reservoir means, and to be closed in the presence of pressure within said space; second conduit means connecting said pump housing space with said saw chain; and a pressure valve connected in said second conduit means, arranged to be closed by suction in said space, and to be opened in the presence of pressure within said space to transmit lubricant from said space to said saw chain, whereby rotation of said guide bar in said opposite direction will draw lubricant from said reservoir means through said suction valve and will force the pressure valve shut, and rotation of said guide bar in said one direction thereafter will close the suction valve and force the lubricant through said second conduit means to the saw chain.

2. Apparatus according to claim 1, wherein the piston is so shaped and inserted into the pump housing that the volume of the inner space of the housing is changed only by displacement of the piston.

3. Apparatus according to claim 1, wherein the suction valve and the pressure valve are formed to be a part of the lubricant pump, and said valves each include a valve housing mounted on said pump housing.

4. Apparatus according to claim 3, wherein each of said suction valve and said pressure valve includes a valve seat, a valve element, and a spring arranged to urge said valve element into engagement with said valve seat, all mounted within a chamber contained in the respective valve housing.

5. Apparatus according to claim 4, wherein each of said valve housings has coupling means formed thereon for connection with said first and said second conduit means, respectively.

6. Apparatus according to claim 1, wherein the housing of the lubricant pump has a bearing flange thereon which is coupled by means of a bearing shaft to said frame, and said piston is connected with the guide bar.

7. Apparatus according to claim 6, wherein said bearing shaft of the pump housing is situated beside the longitudinal axis of said piston, or an extension of said axis.

8. Apparatus according to claim 1, wherein said guide bar includes a mounting end and a free end, said free end having a wheel thereon for supporting said saw chain, said second conduit means including a channel running through said guide bar from said mounting end to said free end, and adapted to deliver lubricant to the lower portion of said saw chain at said wheel.

9. Apparatus according to claim 1, wherein said guide bar is mounted on one end of an arm which is pivotally mounted centrally thereof on said frame by a shaft for rotation about said shaft, said lubricant pump being connected with said arm.

10. Apparatus according to claim 9, including additionally motor means for driving said saw chain, said motor means including a drive shaft, and said drive shaft being arranged concentrically with said shaft mounting said guide bar.

11. Apparatus according to claim 9, wherein said power unit means is connected with the other end of said arm, and is operable to rotate said arm about said shaft.

12. Apparatus according to claim 10, wherein said power unit is a hydraulic cylinder, and wherein said lubricant pump is connected with said arm on the opposite side of said shaft from where said power unit is connected.

* * * * *